W. E. SYKES.
MACHINE FOR CUTTING THE TEETH OF STRAIGHT SPUR GEAR WHEELS.
APPLICATION FILED JULY 6, 1914.
1,165,214.
Patented Dec. 21, 1915.
7 SHEETS—SHEET 2.
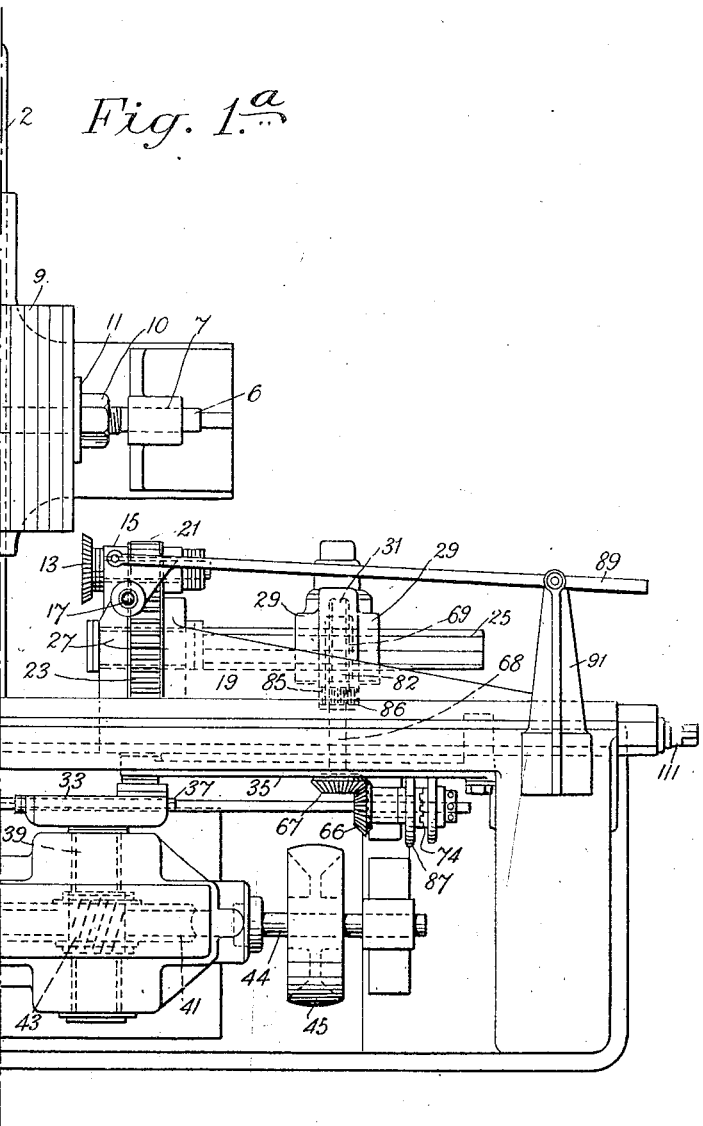
Fig. 1.ª
WITNESSES.
INVENTOR.
William E. Sykes
by James L. Norris
Attorney W. E. SYKES.
MACHINE FOR CUTTING THE TEETH OF STRAIGHT SPUR GEAR WHEELS.
APPLICATION FILED JULY 6, 1914.
1,165,214.
Patented Dec. 21, 1915.
7 SHEETS—SHEET 3.
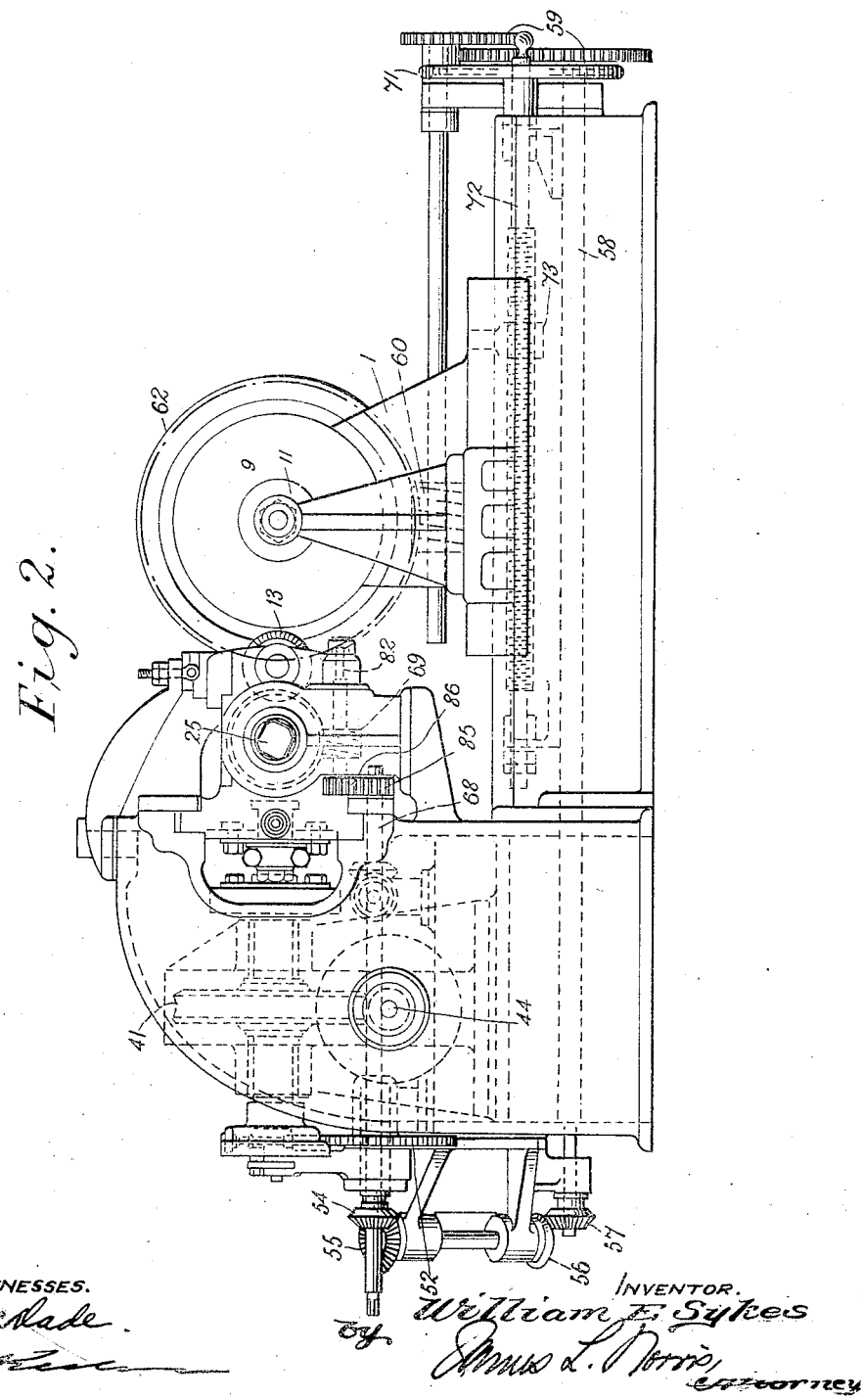

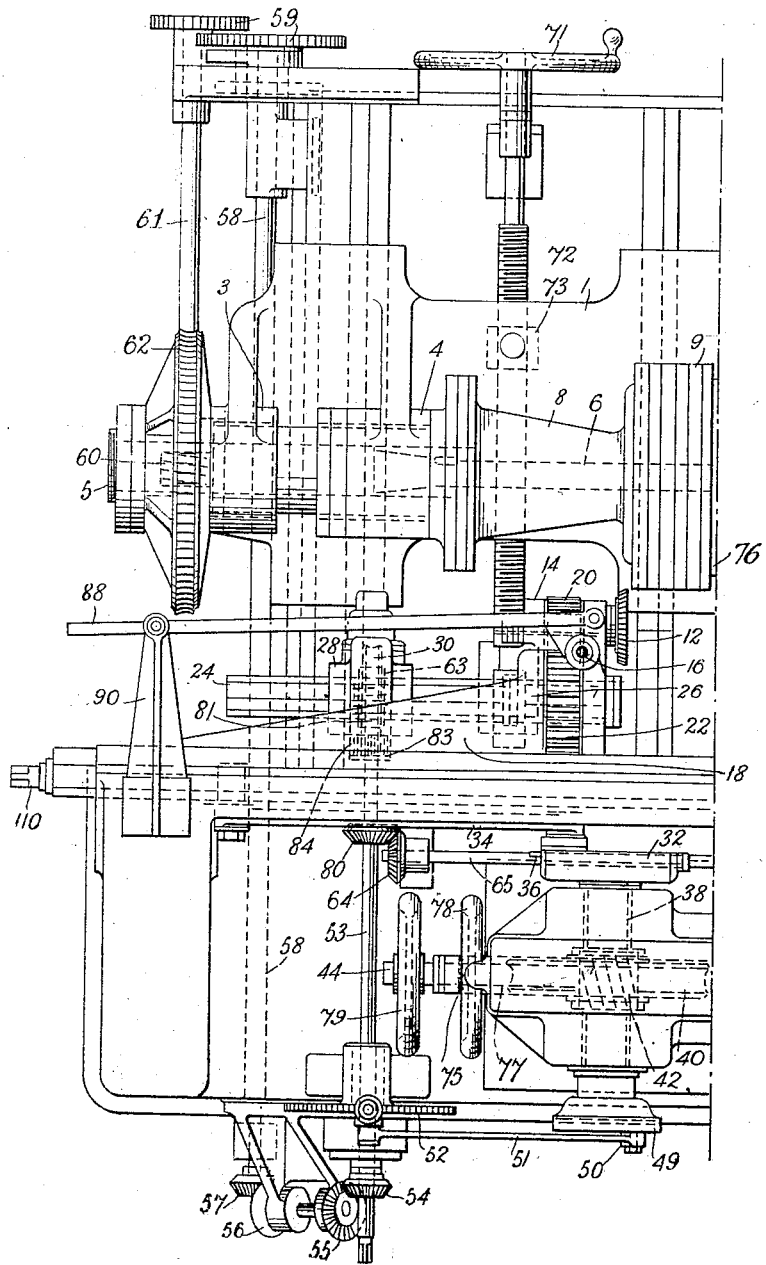

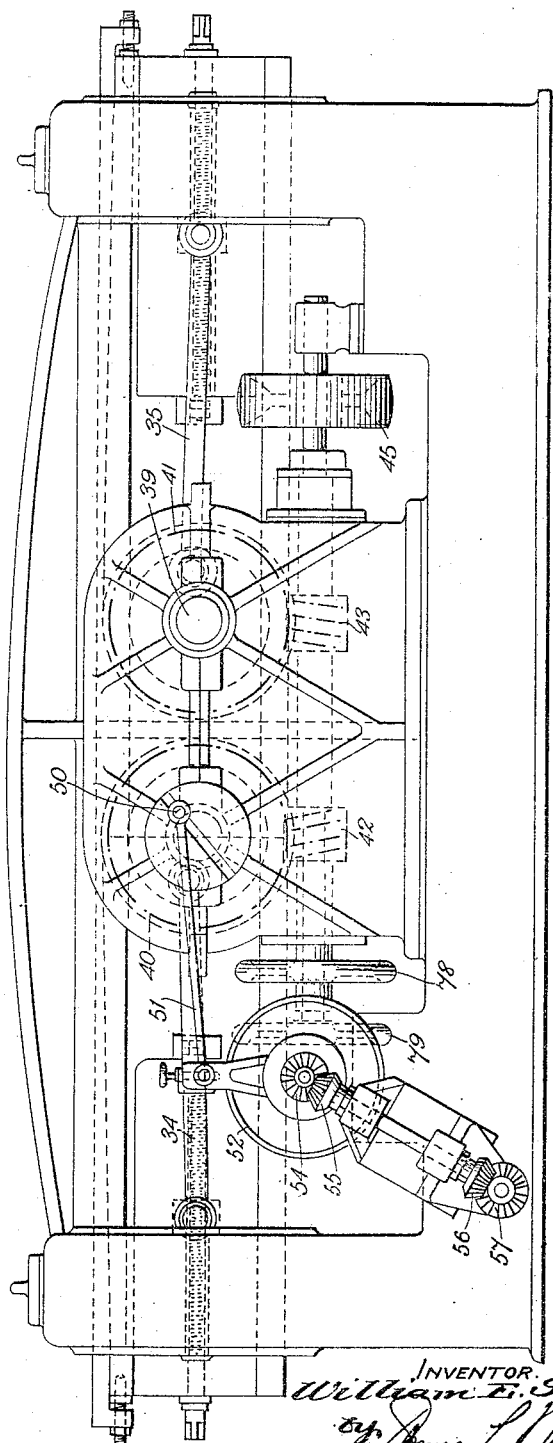

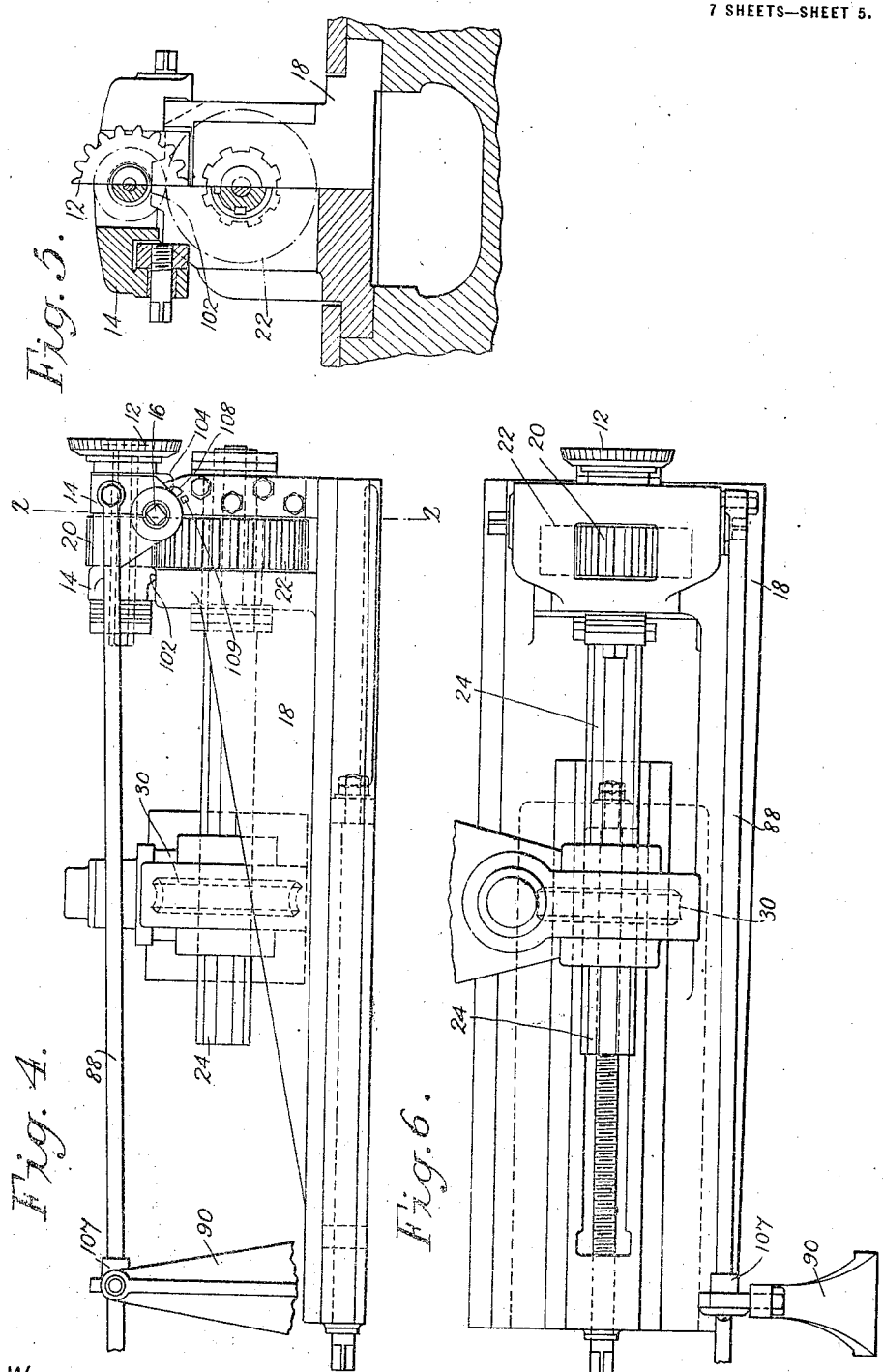

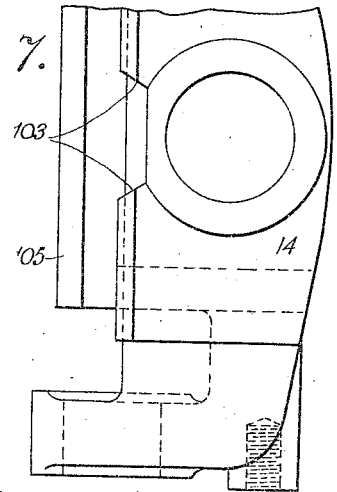
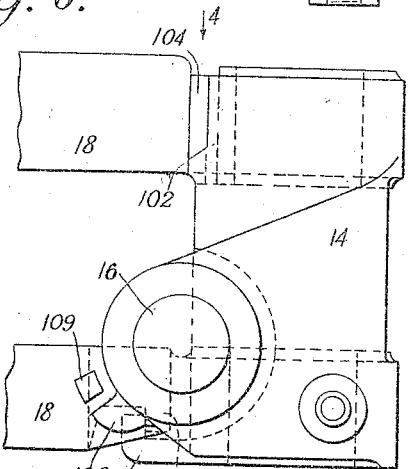
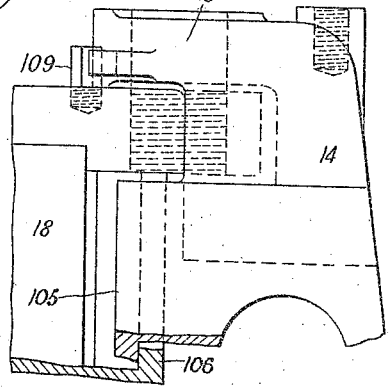

W. E. SYKES.
MACHINE FOR CUTTING THE TEETH OF STRAIGHT SPUR GEAR WHEELS.
APPLICATION FILED JULY 6, 1914.

1,165,214.

Patented Dec. 21, 1915.

7 SHEETS—SHEET 7.

UNITED STATES PATENT OFFICE.

WILLIAM EDWIN SYKES, OF SLOUGH, ENGLAND.

MACHINE FOR CUTTING THE TEETH OF STRAIGHT-SPUR GEAR-WHEELS.

1,165,214.  Specification of Letters Patent.  Patented Dec. 21, 1915.

Application filed July 6, 1914. Serial No. 849,297.

*To all whom it may concern:*

Be it known that I, WILLIAM EDWIN SYKES, a subject of His Majesty the King of Great Britain, residing at Slough, in the county of Buckingham, England, have invented a new and useful Improvement in Machines for Cutting the Teeth of Straight-Spur Gear-Wheels, of which the following is a specification.

The present invention relates to improvements in machines for cutting the teeth of straight spur gear wheels and is a modification of the machine shown and described in U. S. Letters Patent No. 1,103,851, granted to me July 14, 1914, the present object being to cut one or more straight tooth spur gear wheels at the same time on one machine by providing two cutters of tooth disk or spur pinion form instead of only one such cutter as heretofore in this class of straight toothed spur gear generating machines, a further object of the invention being to provide means for tilting the carrier or carriers so that the cutter is withdrawn from the work during the idle or return stroke and also to provide means for maintaining the carrier rigid on its carriage during the cutting stroke.

The invention will now be described with reference to the accompanying drawings which illustrate one embodiment of this invention, in which:—

Figure 10:
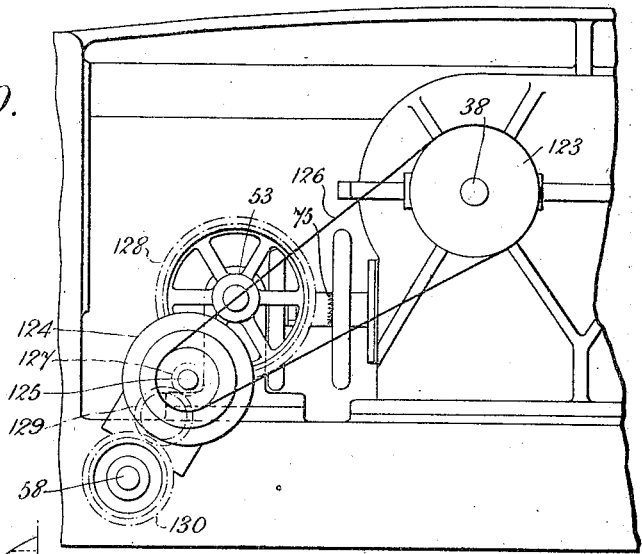
Figure 11:
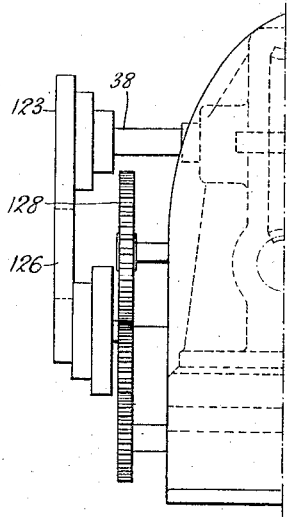
Figure 12:
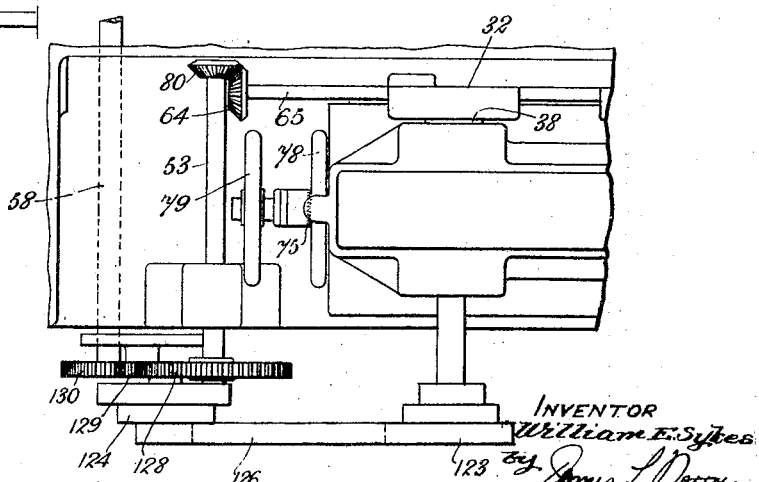

Figures 1 and 1ª are a plan view of a machine arranged to cut straight tooth spur gear wheels. Figs. 2 and 3 are side elevation and front elevation respectively of a machine arranged to cut straight tooth spur gear wheels, and Fig. 4 is a plan on an enlarged scale of the cutter holder and its connected parts. Fig. 5 shows half the mechanism in end elevation, and half in cross section on line 2—2 of Fig. 4. Fig. 6 is a side elevation. Fig. 7 is an elevation on an enlarged scale, of the tool holder removed from the sliding carriage, looking in the direction of the arrow 4, Fig. 8. Fig. 8 is a side view on an enlarged scale, of the tool holder and part of the traveling carriage. Fig. 9 is an end elevation also on an enlarged scale of the tool holder looking in the direction of the arrow 6, Fig. 8, and, Figs. 10, 11 and 12 are end elevation, side elevation, and plan, respectively, of part of a machine, illustrating a modified form of feed mechanism.

In Figs. 1 to 3 of the drawings, 1 denotes a saddle mounted on a bed 2, 3 and 4 are bearings mounted on the saddle to carry the revoluble head spindle 5. An arbor or mandrel 6, mainly shown by dotted lines, extends from the spindle 5, its outer end being journaled in the bearing 7 carried by the saddle. The arbor or mandrel 6, passes through a distance piece or chuck 8, and is arranged and adapted to carry the assemblage of wheel blanks 9, which represent the work to be done. A distance collar 76, is placed centrally between the wheel blanks so as to provide a groove or central space. For the purpose of securing the wheel blank in position a screw thread is formed on the arbor to receive a nut 10, a washer 11 being placed between the work and the nut. Although for example twelve wheel blanks are shown in the drawings, it will be readily understood that a greater or lesser number can be mounted for cutting.

The cutters 12 and 13 are mounted on spindles revoluble in holders or boxes 14, and 15, which are pivoted or hinged at 16 and 17, to sliding carriages 18 and 19. Within the boxes 12 and 13, and on the spindles carrying the cutters, are mounted spur pinions 20, 21, engaging with spur wheels 22 and 23, mounted on the spindles 24, and 25, each between the faces of bearings 26, 27, forming part of the sliding carriages, 18 and 19. The spindles 24 and 25 are extended beyond the bearings 26, 27, and such extended parts may be formed octagonal in cross section and pass through bearings 28, 29, rigidly supported by the bed of the machine. Although the guides on the spindles 24, 25, and in the bearings 28, 29, are shown octagonal they may be made any other desired shape, as for example square, hexagonal, or round with a groove and key. Worm wheels 30 and 31, having projecting bosses are revolubly mounted in the bearings 28, 29, through which worm wheels the spindles 24, 25, are adapted to slide.

The sliding carriages 18 and 19, are reciprocated by cranks or crank disks 32 and 33, by means of connecting rods 34 and 35. Adjustment for the length of stroke is effected by means of adjusting screws 36, 37, which vary the position of the crank pins on the crank disks 32, 33, and the adjustment of the position of the sliding carriages 18, 19, is effected by screws 110 and 111. The crank disks 32 and 33 are mounted on shafts 38, 39, carrying worm wheels 40 and 41 driven by worms 42 and 43. Worm 43 is mounted on shaft 44, which also carries the driving pulley 45, while worm 42 is mounted on a sleeve 77, connected to shaft 44, by a jaw clutch 75 which is held in engagement by a nut and a lock nut. The hand wheel 78 is mounted on the sleeve carrying worm 42, and hand wheel 79, on shaft carrying worm 43, so that when the jaw clutch is out of engagement these hand wheels enable the relative position of the crank pins on disks 32 and 33 to be altered to any angle and if displaced 180°, one cutter would make a working stroke while the other was on the return stroke. The worm wheel shaft 38 carries at its outer end a further crank disk 49 provided with an adjustable crank pin 50, which actuates, by means of connecting rod 51 ratchet wheel 52, mounted on shaft 53, on which, a bevel wheel 54 is mounted. A bevel wheel 55 intermeshes with bevel wheel 54 to drive, through the bevel wheels 56, 57, the shaft 58 and through the train of change wheels 59 and worm 60, slidably mounted on the shaft 61, the worm wheel 62 which turns the spindle 5 and the wheel blank 9. On the inner extremity of shaft 53, is keyed a spur wheel 83 engaging with a similar spur wheel 84, which is keyed to shaft 81 carrying worm 63 engaging with worm wheel 30. A further bevel wheel 80 is provided on shaft 53 adapted to intermesh with and drive bevel wheel 64 keyed on a shaft 65 which carries the bevel wheels 66 and 67. The driven wheel 67 is keyed to shaft 68, which also carries a spur wheel 85 engaging with a similar spur wheel 86 keyed to a shaft 82 carrying a worm 69 engaging with worm wheel 31. The jaw clutch 74 on shaft 65 serves to connect or disconnect the said shaft from bevel gears 66, 67. By turning the hand wheel 87, when the clutch is out of engagement, cutter 13 will be rotated while cutter 12 is stationary. If two separate sets of blanks, as shown in the drawings, are being cut, such independent adjustment may not be necessary, but it will be necessary if only one set of blanks is to be cut or, if only one wide faced wheel is to be cut with both cutters the cutters will then be set for alternating working strokes. If it is desired to cut a single blank with stepped teeth, the working strokes may, or may not be alternating.

The hand wheel 71, the screw 72 and the nut 73, attached to saddle 1, serve to move saddle 1 on the bed 2, thus adjusting the saddle for various diameters of wheel blanks and also providing means for feeding the blanks against the cutters.

The action of the machine is as follows:— When the cutters and blanks are fixed in position as shown, the position and stroke of the cutters correctly adjusted and the desired change wheels 59 mounted, but the pawl kept out of engagement with the ratchet wheel 52, sliding saddle 1 is moved by means of a hand wheel 71, until the desired depth of tooth is reached, then the ratchet wheel 52 is put into operation with the result that on every return stroke of cutter 12, a slight motion is imparted to shaft 53 and thence through intervening mechanism, previously described to the cutters and simultaneously to the wheel blanks 9. The ratio of the change gears 59 is chosen so that the relative motion of the pinion shaped cutters 12, 13, and the wheel blanks 9, is the same as that of a pair of spur gear wheels intermeshed. It will therefore be seen that the machine works on the generating principle, and that when the wheel blank has made one revolution the work is completed, providing the work has been fed so far against the cutters that the correct tooth depth is cut. If desirable for any particular class or size of work two or more separate cuts may be taken, that is to say, some fraction of the tooth depth may be cut on the first revolution of the blanks and the remaining depth on one or more further revolutions of the blanks. With the adjustments shown on the drawings the generating feed motion will be imparted to the cutters on their return strokes, but if the crank disks 32, 33, operating the cutters are displaced in the manner previously described the feed will be imparted while one cutter is on its working stroke, and the other on its return stroke.

While it has been found that the ratchet generating feed mechanism above described for operating the generating mechanism is convenient, it will be apparent that such mechanism may consist of a belt drive running on cone pulleys to enable variable speeds to be obtained. In order to obtain a sufficiently high belt speed, spur reduction gears may be employed. A mechanism of the type above indicated is illustrated in Figs. 10, 11 and 12 and consists of a cone pulley 123 mounted on the reduced end of the worm wheel shaft 38, a second cone pulley 124 being mounted on a stud shaft 125, such pulleys being connected together by a belt 126. A pinion 127 is mounted on the stud shaft 125 and engages with gear wheel 128 on the end of the shaft 53 and also with the intermediate pinion 129 which engages with gear wheel 130 mounted on the end of the shaft 58. This train of gears apart from providing a speed reduction also serves to connect shafts 53 and 58 in place of bevel gears 54, 55 and 56, 57.

When the cutters are moving through their return or idle stroke, unless some arrangement is made for lifting them slightly away from the work, they may be damaged, and means for effecting this have been indicated in Fig. 1 and on an enlarged scale in Figs. 4 to 9 of the drawings. The tool holder or box 14, in addition to the hinge or pivot 16 is provided with a seating 102 which co-acts with a bearing surface formed on the carriage 18 to prevent horizontal displacement while the cutter is on its working stroke. Further seatings 103 arranged to co-act with bearing surfaces formed on a projection 104 on the carriage 18 and adapted to prevent vertical displacement are also provided, the combined action of these two seatings further preventing angular displacement. A further seating or abutment in the form of a hook 105 on the tool holder engaging with a projection 106 on the sliding carriage is arranged and adapted to prevent excessive pressure being transmitted to the hinge or trunnions 16 on the working stroke. The tool box or holder is actuated by causing it to tilt on the hinge 16 away from its several seatings on the commencement of the return or back stroke and to return to its seatings on the commencement of the cutting stroke, by means of a friction rod 88 working in adjustable friction bush 107, this friction bush being secured in a bracket 90 fixed to the bed of the machine. The action of this part of the machine is as follows:—When the sliding carriage 18 commences to reciprocate on its cutting stroke the friction rod 88 holds the tool holder or box firmly on its seatings 102, 103, and the hook 105 on the holder 14 is drawn against the hook 106 on the carriage 18, the pressure of the cutter on the work further serves to hold the tool holder firmly on its seatings and abutments. On the commencement of the return stroke the friction rod tilts the cutter slightly away from the work until a stop 108 comes into contact with a stop pin 109 thereby preventing any further tilting of the holder. The cutter is thus held away from the work until the commencement of the working stroke thereby preventing damage to the cutting edges.

What I claim is:—

1. In a machine for generating and cutting straight toothed spur gear wheels, the combination of a slidable carriage, a cutter holder pivoted thereon, a shaft revolubly mounted in said holder a straight toothed pinion shaped cutter mounted thereon, bearings formed on said carriage, a bearing mounted on and fixed to the frame of the machine, a gear wheel rotatably mounted in said bearing, a spindle revolubly mounted in the bearings on the carriage and slidably arranged in said gear wheel, two engaging gear wheels mounted, respectively, on said shaft and spindle, means for imparting an intermittent rotary movement to said spindle and shaft, and means for imparting a reciprocating movement to said slidable carriage.

2. In a machine for generating and cutting straight toothed spur gear wheels, the combination of means for mounting and turning a wheel blank on its axis, a bed arranged lengthwise in a plane parallel with said axis, two carriages mounted on said bed, means for imparting a reciprocatory movement to each of said carriages, a cutter holder pivoted to each of said carriages, a pinion shaped cutter mounted in each of said carriages, means for tilting said cutter holders away from the work when the cutters are making their return strokes, means for maintaining the holders rigid on the working stroke of the cutters, means adapted to impart an intermittent feed motion to said cutters, and means for adjusting the relative positions of said cutters with respect to each other and to the work being done.

3. In a machine for generating and cutting straight toothed spur gear wheels, the combination of a slidable carriage, a cutter holder pivoted thereon, a shaft revolubly mounted in said holder, a cutter mounted on said shaft, a spindle revolubly mounted in the carriage, two engaging gear wheels mounted respectively on said shaft and spindle, means for reciprocating the slidable carriage, means for moving and holding the cutter away from the wheel being cut while the cutter is making its return stroke, means for limiting such movement, means for holding said cutter holder rigid on the working stroke of the cutter, and means for imparting an intermittent rotary feeding movement to said spindle and shaft.

4. In a machine for generating and cutting straight toothed spur gear wheels, the combination of means for mounting and turning a plurality of wheel blanks with their axes co-axially arranged, a bed arranged lengthwise in a plane parallel with the axis of said blanks, two carriages mounted on said bed, a cutter holder carried by each carriage, a cutter formed as a straight toothed pinion mounted in each holder, bearings mounted on and fixed to the frame of the machine, a gear wheel rotatably mounted in each of said bearings, a spindle revolubly mounted in each carriage and slidably arranged in each of said gear wheels but having no independent rotary motion apart from said gear wheels, means connecting said spindles and cutters, means for imparting an intermittent rotary movement to said spindles and cutters and means for imparting a reciprocating movement to each of said carriages.

5. In a machine for generating and cutting the teeth of gear wheels, the combination of a reciprocating carriage, a cutter holder mounted thereon, a shaft revolubly mounted in said holder, a pinion shaped cutter mounted on said shaft and means for actuating said cutter holder whereby the cutter is tilted away from the work during the return or idle stroke.

6. In a machine for generating and cutting the teeth of gear wheels, the combination of a reciprocating carriage, a cutter holder pivoted thereon, a shaft revolubly mounted in said holder, a pinion shaped cutter mounted on said shaft and means for tilting said cutter holder whereby the cutter is caused to recede from the work during the return or idle stroke.

7. In a machine for generating and cutting the teeth of gear wheels, the combination of a reciprocating carriage, a cutter holder pivoted thereon, a shaft revolubly mounted in said holder, a pinion shaped cutter mounted on said shaft, a rod pivoted on said holder, a support for said rod mounted on the frame of the machine, and a frictional device carried by said support through which said rod is arranged to slide when the carriage is reciprocated whereby the cutter holder is tilted and the cutter caused to recede from the work during the idle stroke.

8. In a machine for generating and cutting the teeth of gear wheels, the combination of a reciprocating carriage, a cutter holder pivoted thereon, a shaft revolubly mounted in said holder, a pinion shaped cutter mounted on said shaft, recessed seatings on the cutter holder, and projecting bearing surfaces on the carriage co-acting and interlocking therewith, thereby preventing both vertical and horizontal displacement of the holder when the cutter is working on its cutting stroke.

9. In a machine for generating and cutting the teeth of gear wheels, the combination of a reciprocating carriage, a cutter holder pivoted thereon, a shaft revolubly mounted in said holder, a pinion shaped cutter mounted on said shaft, means for tilting said cutter holder whereby the cutter is held away from the work on the return or idle stroke and means for holding said cutter holder rigid on the carriage when the cutter is working on its cutting stroke.

10. In a machine for generating and cutting the teeth of gear wheels, the combination of a reciprocating carriage, a cutter holder pivoted thereon, a shaft revolubly mounted in said holder, a pinion shaped cutter mounted on said shaft, a frictionally controlled rod pivoted on said holder for tilting said holder whereby the cutter is held away from the work on the return or idle stroke, and means for holding said cutter holder rigid on its carriage when the cutter is working on its cutting stroke.

11. In a machine for generating and cutting the teeth of gear wheels, the combination of a reciprocating carriage, a cutter holder pivoted thereon, a shaft revolubly mounted in said holder, a pinion shaped cutter mounted on said shaft, means for tilting said cutter holder whereby the cutter is held away from the work during the return or idle stroke, and means for limiting said tilting movement.

12. In a machine for generating and cutting the teeth of gear wheels, the combination of a reciprocating carriage, a cutter holder pivoted thereon, a shaft revolubly mounted in said holder, a pinion shaped cutter mounted on said shaft, means for tilting said cutter holder whereby the cutter is held away from the work during the return or idle stroke, and means comprising a stop on the holder and a stop on the carriage for limiting said tilting movement.

13. In a machine for generating and cutting the teeth of gear wheels, the combination, of a reciprocating carriage, a cutter holder pivoted thereon, a shaft revolubly mounted in said holder, a pinion shaped cutter mounted on said shaft, and means for preventing excessive pressure on the hinges or trunnions, by which the cutter holder is supported on the carriage, when the cutter is working on its cutting stroke.

14. In a machine for generating and cutting the teeth of gear wheels, the combination of a reciprocating carriage, a cutter holder pivoted thereon, a shaft revolubly mounted in said holder, a pinion shaped cutter mounted on said shaft, means comprising a hook like part on the cutter holder and a projection on the carriage co-acting therewith for the purpose of preventing excessive pressure on the hinges or trunnions, by which the cutter holder is supported on the carriage, when the cutter is working on its cutting stroke.

15. In a machine for generating and cutting the teeth of gear wheels, the combination of a reciprocating carriage, a cutter holder pivoted thereon, a shaft revolubly mounted in said holder, a pinion shaped cutter mounted on said shaft, means for holding said cutter holder rigid on the carriage on the working stroke of the cutter, and means for preventing excessive pressure on the hinges or trunnions, by which the cutter holder is supported on the carriage, when the cutter is working on its cutting stroke.

16. In a machine for generating and cutting the teeth of gear wheels, the combination of a reciprocating carriage, a cutter holder pivoted thereon, a shaft revolubly mounted in said holder, a pinion shaped cutter mounted on said shaft, means for tilting said cutter holder whereby the cutter is held away from the work during the return or idle stroke, and means for preventing excessive pressure on the hinges or trunnions, by which the cutter holder is supported on the carriage, when the cutter is working on its cutting stroke.

17. In a machine for generating and cutting the teeth of gear wheels, the combination of a reciprocating carriage, a cutter holder pivoted thereon, a shaft revolubly mounted in said holder, a pinion shaped cutter mounted on said shaft, means for tilting said cutter holder whereby the cutter is held away from the work during the return or idle stroke, means for limiting said tilting movement, means for holding said cutter holder rigid on the carriage on the working stroke of the cutter, and means for preventing excessive pressure on the hinges or trunnions, by which the cutter holder is supported on the carriage, when the cutter is working on its cutting stroke.

18. In a machine for generating and cutting the teeth of gear wheels, the combination of a carriage, a cutter holder mounted thereon, means for reciprocating said carriage, a cutter carried by said holder, means comprising a frictionally controlled rod pivoted to said holder for tilting the cutter away from the work on the return or idle stroke, means comprising a stop on the holder and a co-acting stop on the carriage for limiting said tilting movement, means comprising seatings on the cutter holder and co-acting bearing surfaces on the carriage for holding said cutter holder rigid on the carriage on the working stroke of the cutter and means comprising a hook like part on the holder and a co-acting projection on the carriage for the purpose of preventing excessive strain on the pivots by which the holder is supported on the carriage on the working stroke of the cutter.

In witness whereof I have hereunto set my hand in the presence of two subscribing witnesses.

WILLIAM EDWIN SYKES.

Witnesses:
A. KNIGHT CROAD,
H. CLIFFORD.